April 20, 1954     J. J. RILEY     2,676,288
RECTIFIER ASSEMBLY AND COOLING MEANS THEREFOR
Filed April 17, 1952
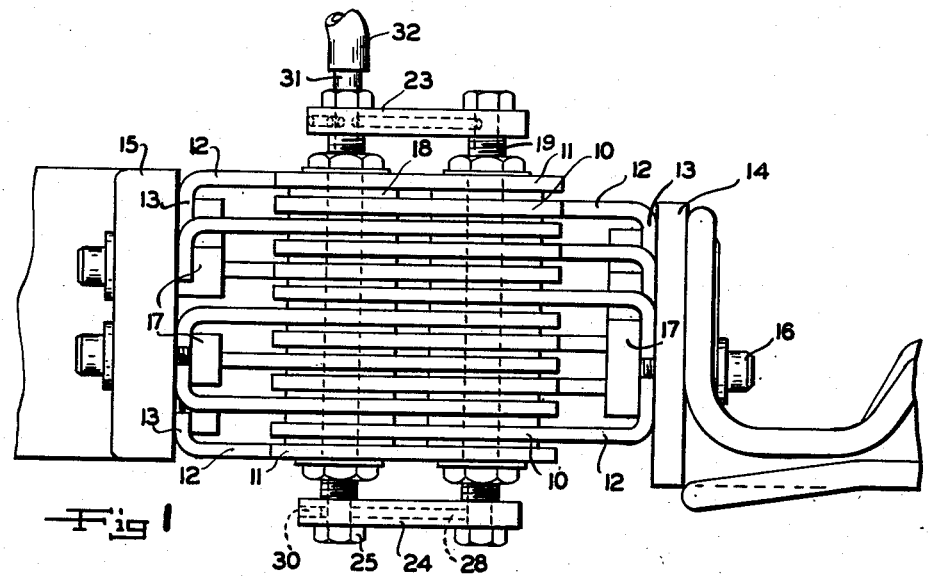
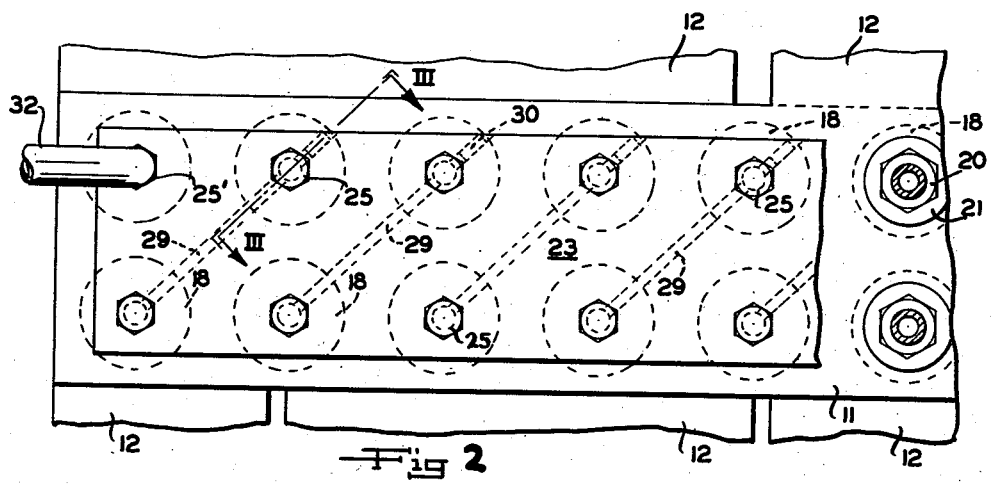
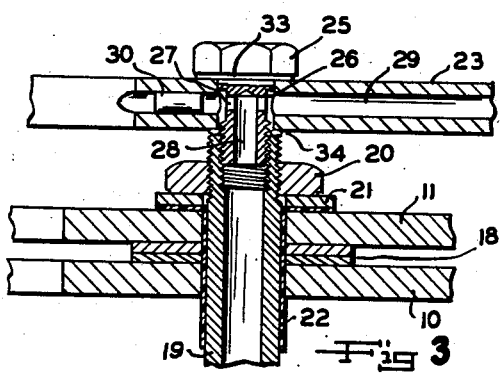
INVENTOR
JOSEPH J. RILEY
BY Francis J. Klempay
ATTORNEY Patented Apr. 20, 1954

2,676,288

UNITED STATES PATENT OFFICE 2,676,288

RECTIFIER ASSEMBLY AND COOLING MEANS THEREFOR

Joseph J. Riley, Warren, Ohio, assignor to The Taylor-Winfield Corporation, Warren, Ohio, a corporation of Ohio Application April 17, 1952, Serial No. 282,830

5 Claims. (Cl. 317—234)

1

The present invention relates to improvements in rectifier assemblies of the dry disc type, and more particularly to an improved construction of such rectifiers, including novel means to remove heat generated internally of the rectifier apparatus.

An important factor in the power output capacity of dry disc rectifier assemblies is the ability of the assembly to quickly dissipate internally generated heat. Thus, in the electric resistance welding art, for example, where unusually high load current must be conducted by rectifying apparatus of moderate physical size, it is often necessary to provide means for rapidly conducting heat away from the apparatus.

Heretofore it has been proposed to provide for the circulation through and/or about the rectifying apparatus of a cooling medium such as water or air or the like whereby substantially positive and readily controllable heat removal is afforded. I have found, however, that heretofore proposed arrangements for this purpose are unsatisfactory in one or more respects, as for example in mechanical complexity and/or in inadequate capacity to remove heat. Accordingly, it is the ultimate object of this invention to provide a novel and substantially improved rectifier assembly, including internal forced circulation cooling means, whereby the power output capacity of the rectifier apparatus may be substantially increased, but without unnecessary increase in the difficulty and/or cost of manufacture.

More specifically, it is an object of the present invention to provide in rectifier assemblies of known general types certain modifications and improvements in design and construction whereby cooling means may be readily provided internally of the assembly.

Another object of this invention resides in the provision of a dry disc type rectifier assembly wherein improved means are provided internally of the apparatus for removing heat directly from the rectifier elements as well as from the conductor bars leading to and from the rectifier elements. A major portion of the heat generated by rectifying apparatus is, of course, generated by the rectifying discs or elements, and accordingly, by removing heat directly from such elements I have provided for improved capacity and more accurate temperature control of the apparatus as a whole. This latter feature is of substantial importance, particularly in electric resistance welding art where electrical characteristics of the welding apparatus must be predictable and accurately controllable in order to obtain consistently good welding results.

2

The above and other objects and advantages of the invention will become apparent upon full consideration of the following detailed specification and accompanying drawing wherein is illustrated a certain preferred embodiment of my invention.

In the drawing:

Figure 1 is an enlarged fragmentary side elevation of a direct current power supply utilizing a rectifier assembly constructed in accordance with the teachings of my invention;

Figure 2 is a fragmentary top plan view of the apparatus of Figure 1; and

Figure 3 is an enlarged fragmentary section view taken along line III—III of Figure 2.

Referring initially to Figure 1, the numerals 10 and 11 designate respectively spaced parallel input and output conductor plates of my rectifier assembly, and in accordance with known practice the plates 10 and 11 are stacked in alternate relation. Each of the conductor plates 10 and 11 has an integrally extending tab portion 12 and right-angularly disposed contact portion 13 adapted to overlie in one instance transformer terminal pads 14 and in the other instance output terminals 15. It will be understood, of course, that terminal pads 14 form part of a secondary circuit of a transformer bank, not shown, which may or may not be of a multiphase type. Generally only two output terminals 15 are utilized, and in this respect it will be understood that output conductor plates 11 will be selectively connected to the two output terminals in such manner as to cause one to be at all times of positive polarity with respect to the other. In the present illustration bolts 16 and longitudinally disposed bars 17, both preferably of current conductive material, are used to firmly and evenly clamp the contact portions 13 to the pads 14 and terminals 15 respectively.

Interposed between each of the alternately stacked input and output conductor plates 10 and 11 are a plurality of rectifier elements 18 which, in accordance with the teachings of the invention, are of a disc type having a central aperture therein. Rectifier elements 18 may be of any suitable material, such as for example copper sulfide and magnesium, and the same are preferably oriented in the same direction whereby to freely pass current flowing in such direction while substantially impeding current flow in the other direction. As illustrated in Figure 2, the rectifier elements are arranged in a plurality of axially aligned stacks which are uniformly spaced across the surface of conductor plates 10 and 11.

To connect the conductor plates 10 and 11 in a unitary and mechanically rigid manner as well as to provide adequate electrical contact between the plates 10 and 11 and rectifier elements 18 I provide a plurality of tubular rods 19 which are threaded at each end and which are adapted to be received within aligned apertures in the plates 10 and 11 and rectifier elements 18. The threaded end portions of rods 19 are adapted to receive washers 21 and nuts 20 in the manner illustrated in Figures 2 and 3 whereby the conductor plates and rectifier elements may be tightly compressed to achieve the mechanical and electrical characteristics desired.

Tubular rods 19 are preferably of highly heat conductive material, such as copper for example, and accordingly it is necessary to provide a tubular layer 22 of insulating material between rods 19 and plates 10 and 11, and between washers 21 and the end conductor plates 11. To properly carry out the invention insulating layer 22 should be as thin as practicable.

It is proposed by the present invention to provide internal cooling of the rectifier apparatus by causing a fluid cooling medium such as water or oil to pass internally through the tubular rods 19 whereby heat may be advantageously removed from the hot center areas of the rectifier discs 18 and from the portions of conductor plates 10 and 11 adjacent such areas. In the preferred embodiment of the invention I provide fluid circulation in the manner desired by means of manifold plates 23 and 24 which are positioned adjacent each end of the tubular rods 19 in open communication therewith.

In the illustrated arrangement manifold plates are secured to the ends of rods 19 by means of bolts 25 which pass through the manifolds 23 and 24 and engage suitable threads provided internally of rods 19 at the ends thereof. Bolts 25 are annularly recessed near the head end portion, as at 26, and are provided with one or more fluid passages 27 communicating with the annular recess 26 and extending radially inwardly of the bolt. A longitudinal bore 28 provides communication between radial passages 27 and the hollow interior of rods 19 as illustrated in Figure 3.

It is usually preferred that the cooling medium pass through the plurality of tubular rods 19 in series relation, and accordingly I have provided a plurality of lateral and diagonal bores 28 and 29 respectively in manifold plates 23 and 24 respectively. The bores 28 and 29 may be readily provided by drilling laterally or diagonally through the manifold plates 23 or 24 so as to intersect two bolts 25 along the annularly recessed portion 26 thereof. The extreme end portion of the bores 28 and 29 may be closed off by means of plug members 30 which are forced into the bore in the manner illustrated in Figure 3.

To prevent leakage of the liquid cooling medium about the bolts 25, I may provide resilient O-ring or other suitable sealing members 33 and 34 to provide a fluid-tight seal at both sides of the manifold plates 23 and 24.

As indicated in Figure 1, I may provide a modified bolt 25' having an upwardly extending tubular portion 31 communicating through suitable condiut means 32 with a source of fluid cooling medium, not shown. And it will be understood that a pair of such modified bolts 25' will be provided for each series connected fluid circuit incorporated into the apparatus. Usually, of course, there will be only one such series connected circuit, but in certain instances, as for example where an unusually large number of stacks of rectifier elements are used, it may be desirable to provide greater uniformity of cooling by having more than one series connected circuit communicating with a common source of cooling medium.

In the fluid circuit herein described fluid moves from the conduit 32 through bolt 25' and passes downwardly through the tubular rod 19 associated therewith. Upon reaching the lower end of the rod the fluid is directed laterally across the lower manifold 24 through bore 28 to a second rod 19 positioned laterally adjacent the first. The fluid is then directed upwardly through the second rod 19, diagonally through bore 29, and thence downwardly through a third tubular rod 19. By a similar progression the cooling medium flows through the entire circuit and is subsequently discharged or returned to the source for cooling and reuse.

Where desired, manifolds 23 and 24 may be of hollow construction whereby a plurality of parallel fluid circuits are formed by tubular rods 19. This arrangement is not universally favored, however, since localized overheating may result from stoppage of one or a few of the rods 19, and the same, if not detected, may cause considerable damage to the rectifier apparatus. With a series fluid circuit simple automatic means may be provided to act in response to fluid temperature and/or flow to prevent damage due to overheating of the apparatus.

The advantages of my invention should be readily apparent. My novel construction calls for simple modification of rectifier of existing general design whereby the usefulness and power output capacity of the apparatus is substantially improved.

A particularly important feature of my invention resides in the arrangement whereby heat is removed directly from the hottest areas of the rectifier elements. Accurate temperature control of the apparatus is thereby greatly facilitated, and this is an important consideration for such applications as electric resistance welding where electrical characteristics of the apparatus must be accurately controllable and predictable to insure satisfactory welding performance. An additional advantage of this arrangement accrues from the fact that the input and output conductor plates may be maintained at a lower temperature by removing heat directly from the rectifier elements. And this latter feature permits conductor resistance to be maintained at a practical minimum. Cooling rectifier elements in this manner has not heretofore been accomplished by a simple and commercially practical arrangement as has been provided through my invention.

It should be understood, however, that the above specifically described embodiment of the invention is intended to be illustrative only of its scope, and reference should therefore be had to the appended claims in determining the true measure of the invention.

I claim:
1. In a dry disc type rectifying device a plurality of spaced parallel flat input and output conductor plates, a plurality of disc-like rectifying elements interposed between each of said input and output conductor plates, said rectifying elements being arranged in a plurality of axially aligned stacks, said conductor plates and said rectifying elements having axially aligned apertures therein, a plurality of tubular rods inserted in said axially aligned apertures, means engaging the end portions of said tubular rods to compress said plates and rectifying elements, manifold plates secured to each end of said tubular rods and having fluid passages therein communicating with the interior of said rods, said fluid passages being arranged in series relation whereby fluid may be circulated in series relation through each of said tubular rods.

2. Apparatus according to claim 1 further characterized by said manifold plates being secured to said tubular rods by a plurality of bolts adapted for internal engagement with said rods, said bolts having fluid passages therein communicating interiorly with said tubular rods and said fluid passages in said manifold plates.

3. In a dry disc type rectifying device a plurality of spaced parallel flat conductor plates, a plurality of rectifying elements interposed between each of said conductor plates, said rectifying elements being arranged in a plurality of axially aligned stacks and having axially aligned apertures therein, said conductor plates having apertures therein aligned with said first mentioned apertures, tubular members received in said apertures, means engaging said tubular members for compressing said conductor plates and said rectifying elements, and manifold means communicating with the ends of said tubular members and arranged to cause the circulation of a cooling medium therethrough.

4. Apparatus according to claim 4 further characterized by said plurality of stacks being spaced and aligned longitudinally and laterally, and said manifold means comprising a first manifold plate having fluid passages therein providing communication between laterally spaced stacks, and a second manifold plate having fluid passages therein providing communication between diagonally spaced stacks.

5. In a dry disc type rectifying device a plurality of spaced parallel flat conductor plates, a plurality of rectifying elements interposed between each of said conductor plates, said rectifying elements being arranged in a plurality of axially aligned stacks and having axially aligned apertures therein, said conductor plates having apertures therein aligned with said first mentioned apertures, tubular members received in said apertures, means for compressing said conductor plates and said rectifying elements, and means communicating with said tubular members and arranged to cause the circulation of a cooling medium therethrough.

References Cited in the file of this patent

UNITED STATES PATENTS

| Number | Name | Date |
| --- | --- | --- |
| 2,179,293 | Hein | Nov. 7, 1939 |
| 2,474,809 | Abbott | July 5, 1949 |
| 2,522,929 | Cartier | Sept. 19, 1950 |
| 2,601,240 | Blair | June 24, 1952 |
| 2,620,384 | Tarzian | Dec. 2, 1952 |

FOREIGN PATENTS

| Number | Country | Date |
| --- | --- | --- |
| 945,189 | France | Nov. 22, 1948 |